United States Patent
Mayer et al.

(10) Patent No.: US 6,309,707 B1
(45) Date of Patent: *Oct. 30, 2001

(54) COATING COMPOSITION COMPRISING AT LEAST 3 COMPONENTS, PROCESS FOR ITS PREPARATION, AND ITS USE

(75) Inventors: Bernd Mayer, Münster; Uwe Meisenburg, Duisburg; Egbert Nienhaus, Ascheberg, all of (DE)

(73) Assignee: BASF Coatings AG, Muenster-Hiltrup (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/765,609

(22) Filed: Dec. 20, 1996

(30) Foreign Application Priority Data

Jun. 22, 1994 (DE) ............................................. P 44 21 823

(51) Int. Cl.$^7$ ..................... C09D 133/06; C09D 167/02; C09D 175/04

(52) U.S. Cl. ................... 427/386; 427/385.5; 427/393.5; 523/402; 523/412; 523/415; 523/416; 523/417; 524/507; 524/512; 524/513; 524/539; 524/542; 524/558; 524/591; 524/598; 524/604

(58) Field of Search ..................... 524/507, 512, 524/513, 539, 558, 591, 604, 598; 427/386, 393.5, 385.5, 388.4; 523/745, 415, 416, 417

(56) References Cited

U.S. PATENT DOCUMENTS

| 5,304,400 | 4/1994 | Dhein et al. | 427/388.4 |
| 5,331,039 | * 7/1994 | Blum | 524/507 |
| 5,387,642 | * 2/1995 | Blum | 524/591 |
| 5,466,745 | * 11/1995 | Fiori | 524/801 |

FOREIGN PATENT DOCUMENTS

| 25 07 884 A1 | 2/1975 | (DE) | C09D/3/80 |
| 44 21 823 A1 | 6/1994 | (DE) | C09D/175/04 |
| 0 256 540 | 2/1988 | (EP) | C09D/3/49 |
| 0 358 979 A2 | 8/1989 | (EP) | C08G/18/62 |
| 0 368 499 A2 | 10/1989 | (EP) | C09D/167/00 |
| 0 542 105 B1 | 11/1992 | (EP) | C08G/18/42 |
| 0 089 497 A2 | 2/1998 | (EP) | C09D/3/72 |
| 1530022 | * 10/1978 | (GB) . | |
| WO 92/22612 | 12/1992 | (WO) | C09D/7/02 |
| WO 93/09157 | 5/1993 | (WO) | C98G/18/08 |
| 94/07932 | 4/1994 | (WO) | C09D/175/06 |
| WO 95/00570 | 1/1995 | (WO) | C08G/18/08 |

* cited by examiner

Primary Examiner—Patricia A. Short

(57) ABSTRACT

The present invention relates to a coating composition comprising at least three components, characterized in that component (I) contains as binder at least one acrylate copolymer which is dissolved or dispersed in organic solvent and has a number-average molecular weight of between 1000 and 30,000, an OH number of from 40 to 200 and an acid number of from 5 to 150 and/or polyester resin having a number-average molecular weight of between 1000 and 30,000, an OH number of from 30 to 250 and an acid number of from 5 to 150 and/or polyurethane resin having a number-average molecular weight of between 1000 and 30,000, an OH number of from 20 to 200 and an acid number of from 5 to 150, and, if desired, a further binder, the binder components being selected such that a 50% strength solution of the binder in ethoxyethyl propionate has a viscosity at 23° C. of $\leq 2.5$ dPa·s, component (II) contains at least one nonblocked polyisocyanate as crosslinking agent, and component (III) is essentially binder-free and contains water.

4 Claims, No Drawings

COATING COMPOSITION COMPRISING AT LEAST 3 COMPONENTS, PROCESS FOR ITS PREPARATION, AND ITS USE

FIELD OF THE INVENTION

The present invention relates to a coating composition comprising at least three components and based on a hydroxyl- and carboxyl-containing polymer which is dissolved or dispersed in one or more organic solvents, and on an isocyanato-containing crosslinking agent.

The present invention relates, furthermore, to a process for the preparation of these coating compositions and to the use of the coating compositions in refinishing, for the coating of plastics, and as topcoat or filler.

BACKGROUND AND SUMMARY OF THE INVENTION

Coating compositions based on hydroxyl-containing binders and isocyanato-containing crosslinking agents, which are employed in the field of automotive refinishing and are conventional, ie. are dissolved in organic solvents, customarily represent multicomponent systems. One component contains the binder, if desired pigments and fillers, and conventional auxiliaries and additives, and the other component contains the crosslinking agent. In addition, an adjustment additive consisting essentially of a mixture of different solvents is prepared in order to adjust the coating composition to the desired viscosity.

However, it is the aim of the coatings industry, on ecological and economic grounds, to replace as great as possible a proportion of the organic solvents employed in coating materials by water. For the coating of motor vehicles, in particular, there is a great need for aqueous coating materials. This applies both to the area of automotive production-line finishing and to the area of automotive refinishing.

In this context aqueous coating compositions are employed in particular in the area of topcoats. Topcoats are understood here as being coating materials which are used to produce the topmost coat. This topmost coat may comprise one or more layers, especially two layers. Two-layer topcoats are composed of a pigmented basecoat layer and of a clearcoat layer which is pigmented either not at all or only with transparent pigments and is applied over the basecoat layer.

Two-layer coatings are currently produced by the wet-on-wet method, in which a pigmented basecoat is initially applied and the resulting basecoat layer, without a baking step, is covered with a clearcoat, and then basecoat layer and clearcoat layer are cured together. This method is very advantageous in economic terms, but places stringent requirements on the basecoat and the clearcoat. The clearcoat which is applied to the as yet uncured basecoat must neither partially dissolve nor otherwise disturb the basecoat layer, lest coatings of poor appearance be obtained. This applies in particular to coatings in which basecoats containing special-effect pigments (eg. metallic pigments, especially aluminum flakes or pearlescent pigments) are employed. Furthermore, the topcoat compositions must be capable of being applied by spraying using automatic spraying units. For this purpose their solids content at spray viscosity must be high enough for coating films of adequate thickness to be obtained with 1 to 2 spray passes (cross-passes), and they must give baked coating films of good appearance (good evenness, high gloss, low tendency to solvent boil, good topcoat appearance and a high degree of hardness) and good weathering resistance.

In the area of automotive refinishing there is the additional requirement that the coating compositions employed are able to cure fully at low temperatures (generally<80° C.) and lead, even when fully cured at these low temperatures, to films having the good mechanical properties required. polyurethane coating compositions which comprise a hydroxyl-containing polyacrylate resin, dispersed in water, and a polyisocyanate component. However, these coating materials described in EP-B-358 979 exhibit great disadvantages with respect to gloss, relaxation (low graininess of the coating), tendency to solvent boil and, because of this, spray safety, and in respect of weathering resistance, in particular with respect to the resistance in a constant humid climate (40° C., 240 h), processability (fall in viscosity and too short a pot life) and hardness.

Furthermore, DE-B 25 07 884 discloses a process for the preparation of aqueous coating compositions, in which first of all a solution of a carboxyl-containing polyacrylate and/or polyester in an organic solvent is prepared, if desired crosslinking agents, and also pigments and fillers, are dispersed in the organic solution, and the resulting dispersion, following neutralization of the carboxyl groups of the binder, is dispersed in water.

A disadvantage of this process is that the organic solvent has to be removed by azeotropic distillation after preparation of the aqueous dispersions. This additional process step results in additional cost. Moreover, this distillative removal of the solvent can only be carried out at the premises of the manufacturer of the coating compositions, and not at those of the customer. It is therefore necessary to transport and store the finished, aqueous coating materials, which frequently leads to problems especially in the area of automotive refinishing, where in fact very long shelf-lives of at least 24 months are required.

The crosslinking agents employed to prepare the coating compositions described in DE-B 25 07 884 are blocked polyisocyanates, epoxy resins and/or amino resins. These coating compositions described therein therefore cure only at elevated temperatures of between 100 and 300° C., and are therefore unsuitable for the area of refinishing.

Finally, EP-A-368 499 discloses aqueous coating compositions which contain, as hydroxyl-containing binders, polyethers or ether group-containing polyesters, and, as crosslinking agents, amine/formaldehyde resins. These coating compositions are prepared by first of all preparing the binder and the crosslinking agent in an organic solvent. This mixture is admixed shortly before the application of the coating composition with a curing catalyst, and is adjusted with water to the desired viscosity.

These aqueous coating compositions known from EP-A-368 499, however, have the disadvantage of completely inadequate compatibility of the individual components of the coating composition. They are therefore not suitable for the production of clearcoats. In addition, these coating compositions cure only at elevated temperatures and are therefore unsuitable for the area of refinishing. A final, additional disadvantage is the inadequate weathering stability of the resulting coatings.

The object of the present invention is therefore to provide an aqueous coating composition which, in relation to the aqueous two-component polyurethane coating compositions known from EP-B-358 979, has improved properties and/or gives improved coating films. The novel coating composition should above all ensure, in comparison with aqueous coating compositions based on aqueous acrylate copolymer dispersions, improved evenness, improved gloss, improved relaxation (low graininess), lower tendency to solvent boil, enhanced spray safety, improved fullness and an improved weathering resistance of the resulting coatings.

Furthermore, the novel coating composition should be suitable for the area of automotive refinishing, ie. should be fully curable at low temperatures (generally <~80° C.) and should lead to coatings which at the very least meet the requirements which are customarily placed on an automotive refinish. The coating composition should therefore, for example, exhibit good gloss ($\geqq 85$ E at 20°), a high degree of hardness ($\geqq 110$ impacts) and good weathering resistance ($\leqq m1g1$ after 10 days in a constant climate).

This object has surprisingly been achieved by the coating composition of the type mentioned at the outset, which is characterized in that 1.) component (I) contains as binder (A)

(A1) at least one hydroxyl- and carboxyl-containing acrylate copolymer (A1) which is dissolved or dispersed in one or more organic, water-dilutable solvents and has a number-average molecular weight of between 1000 and 30,000, an OH number of from 40 to 200 mg of KOH/g and an acid number of from 5 to 150 mg of KOH/g, and/or (A2) at least one hydroxyl- and carboxyl-containing polyester resin (A2) which is dissolved or dispersed in one or more organic, water-dilutable solvents and has a number-average molecular weight of between 1000 and 30,000, an OH number of from 30 to 250 mg of KOH/g and an acid number of from 5 to 150 mg of KOH/g, and/or (A3) at least one hydroxyl- and carboxyl-containing polyurethane resin (A3) which is dissolved or dispersed in one or more organic, water-dilutable solvents and has a number-average molecular weight of between 1000 and 30,000, an OH number of from 20 to 200 mg of KOH/g and an acid number of from 5 to 150 mg of KOH/g, and (A4) if desired, at least one further binder, the binders (A1) and/or (A2) and/or (A3) and/or (A4) being selected such that a 50% strength solution of the binder (A) in ethoxyethyl propionate has a viscosity at 23° C. of $\leqq 2.5$ dPa·s, 2.) component (II) contains as crosslinking agent (F) at least one nonblocked di- and/or polyisocyanate (F1) which is, if desired, dissolved or dispersed in one or more organic solvents, and, if desired, at least one further crosslinking agent consisting of at least one epoxide compound (F2) having at least two epoxide groups per molecule and/or, if desired, at least one amino resin (F3), and 3.) component (III) is essentially binder-free and contains water.

The present invention relates, furthermore, to a process for the preparation of these coating compositions and to the use of the coating compositions in refinishing, for the coating of plastics, and as topcoat or filler.

It is surprising that the coating compositions according to the invention possess better properties than aqueous coating compositions which comprise the same binders and crosslinking agents but in which the binders, in accordance with the teaching of EP-B-358 979, have been incorporated into the coating composition in the fort of an aqueous dispersion and not as an organic solution or dispersion. Thus, in comparison to these coating compositions, the coating compositions according to the invention are distinguished by improved gloss, improved relaxation (low graininess), lower tendency to solvent boil and, as a result of this, by enhanced spray safety, and by improved weathering resistance (constant humid climate test).

It is also surprising that the coating compositions according to the invention can be prepared from the at least three components by simple mixing without the necessity of complex apparatus for mixing and/or dispersing. The coating compositions according to the invention are therefore particularly suitable for the area of automotive refinishing, since the coating compositions can be prepared by the coater, directly prior to application of the coating compositions, by simple mixing of the components and can be cured at low temperatures.

A further advantage is that the aqueous coating compositions prepared from at least three components have only a low content of volatile organic solvents (VOC=volatile organic content $\leqq 2.8$ pounds per gallon), although the coating compositions are prepared with the use of crosslinking agents and binders dissolved or dispersed in organic solvents. Moreover, the coating compositions according to the invention lead surprisingly to coatings having high gloss, good fullness, good evenness, a high degree of hardness, low tendency to solvent boil and good weathering resistance.

Furthermore, the coating compositions according to the invention ensure a high degree of variability since it is possible to employ not only crosslinking agents, pigments and additives which are recommended for aqueous coating compositions but also crosslinking agents, pigments and additives which are employed in conventional systems.

Finally, the coating compositions according to the invention are distinguished by very good shelf-lives which correspond to those of conventional coating compositions.

In the text below, the individual components of the coating composition according to the invention will first of all be described in more detail.

DETAILED DESCRIPTION

It is essential to the invention that component (I) of the coating composition according to the invention contains as binder (A)

(A1) at least one hydroxyl- and carboxyl-containing acrylate copolymer (A1) which is dissolved or dispersed in one or more organic, water-dilutable solvents and has a number-average molecular weight of between 1000 and 30,000, an OH number of from 40 to 200 mg of KOH/g and an acid number of from 5 to 150 mg of KOH/g, and/or (A2) at least one hydroxyl- and carboxyl-containing polyester resin (A2) which is dissolved or dispersed in one or more organic, water-dilutable solvents and has a number-average molecular weight of between 1000 and 30,000, an OH number of from 30 to 250 mg of KOH/g and an acid number of from 5 to 150 mg of KOH/g, and/or (A3) at least one hydroxyl- and carboxyl-containing polyurethane resin (A3) which is dissolved or dispersed in one or more organic, water-dilutable solvents and has a number-average molecular weight of between 1000 and 30,000, an OH number of from 20 to 200 mg of KOH/g and an acid number of from 5 to 150 mg of KOH/g, and (A4) if desired, a further binder.

The binders (A1) and/or (A2) and/or (A3) and/or (A4) are selected in this context such that a 50% strength solution of the binder (A) in ethoxyethyl propionate has a viscosity at 23° C. of less than or equal to 2.5 dPa·s, preferably of less than or equal to 2.0 dPa·s.

As hydroxyl- and carboxyl-containing acrylate copolymer (A1), all acrylate copolymers having the indicated OH numbers, acid numbers and molecular weights are suitable.

It is preferred to employ acrylate copolymers which, as a 50% strength solution in ethoxyethyl propionate, have a viscosity at 23° C. of ≦3.0 dPa·s, preferably a viscosity of ≦2.0 dPa·s.

As component (A1), it is also preferred to employ acrylate copolymers which are obtainable by polymerization in an organic solvent or a solvent mixture, and in the presence of at least one polymerization initiator, of (a1) an essentially carboxyl-free (meth)acrylic ester which is different from (a2), (a3), (a4), (a5) and (a6) and is copolymerizable with (a2), (a3), (a4), (a5) and (a6), or a mixture of such monomers, (a2) an ethylenically unsaturated monomer which carries at least one hydroxyl group per molecule and is essentially carboxyl-free which is copolymerizable with (a1), (a3), (a4), (a5) and (a6) and is different from (a5), or a mixture of such monomers, (a3) an ethylenically unsaturated monomer which carries at least one carboxyl group per molecule and is copolymerizable with (a1), (a2), (a4), (a5) and (a6), or a mixture of such monomers, and (a4) if desired, one or more vinyl esters of α-branched monocarboxylic acids having 5 to 18 carbon atoms per molecule, and/or (a5) if desired, at least one reaction product of acrylic acid and/or methacrylic acid with the glycidyl ester of an α-branched monocarboxylic acid having 5 to 18 carbon atoms per molecule or, instead of the reaction product, an equivalent quantity of acrylic and/or methacrylic acid, which is then reacted, during or after the polymerization reaction, with the glycidyl ester of an α-branched monocarboxylic acid having 5 to 18 carbon atoms per molecule, (a6) if desired, an essentially carboxyl-free, ethylenically unsaturated monomer which is copolymerizable with (a1), (a2), (a3), (a4), and (a5) and is different from ($a_1$), ($a_2$), (a4) and (a5), or a mixture of such monomers, (a1), (a2), (a3), (a4), (a5) and (a6) being selected in nature and quantity such that the polyacrylate resin (A1) has the desired OH number, acid number and the desired molecular weight.

In order to prepare the polyacrylate resins employed in accordance with the invention it is possible to employ as component (a1) any essentially carboxyl-free ester of (meth) acrylic acid which is copolymerizable with (a2), (a3), (a4), (a5) and (a6), or a mixture of such (meth)acrylic esters. Examples are alkyl acrylates and alkyl methacrylates having up to 20 carbon atoms in the alkyl radical, for example methyl, ethyl, propyl, butyl, hexyl, ethylhexyl, stearyl and lauryl acrylate and methacrylate, and cycloaliphatic (meth) acrylic esters, for example cyclohexyl (meth)acrylate, isobornyl acrylate and t-butylcyclohexyl (meth)acrylate.

As component (a1), it is also possible to employ ethyltriglycol (meth)acrylate and methoxyoligoglycol (meth) acrylate having a number-average molecular weight of preferably 550, or other ethoxylated and/or propoxylated, hydroxyl-free (meth)acrylic acid derivatives.

As component (a2), it is possible to employ ethylenically unsaturated monomers which carry at least one hydroxyl group per molecule and are essentially carboxyl-free, and which are copolymerizable with (a1), (a2) [sic], (a3), (a4), (a5) and (a6) and are different from (a5), or a mixture of such monomers. Examples are hydroxyalkyl esters of acrylic acid, methacrylic acid or of another α,β-ethylenically unsaturated carboxylic acid. These esters may be derived from an alkylene glycol which is esterified with the acid, or they may be obtained by reacting the acid with an alkylene oxide. As component (a2) it is preferred to employ hydroxyalkyl esters of acrylic acid or methacrylic acid, in which the hydroxyalkyl group contains up to 20 carbon atoms, reaction products of cyclic esters, for example ε-caprolactone and these hydroxyalkyl esters, or mixtures of these hydroxyalkyl esters and/or ε-caprolactone-modified hydroxyalkyl esters.

Examples of such hydroxyalkyl esters are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate, hydroxystearyl acrylate and hydroxystearyl methacrylate. Corresponding esters of other unsaturated acids, for example ethacrylic acid, crotonic acid and similar acids having up to about 6 carbon atoms per molecule, can also be employed.

In addition, it is also possible to employ as component (a2) olefinically unsaturated polyols. Preferred polyacrylate resins (A) are obtained if trimethylolpropane monoallyl ether is employed, at least in part, as component (a2) The proportion of trimethylolpropane monoallyl ether is customarily from 2 to 10% by weight, based on the overall weight of the monomers a1) to (a6) which are employed to prepare the polyacrylate resin. In addition, however, it is also possible to add from 2 to 10% by weight, based on the overall weight of the monomers which are employed to prepare the polyacrylate resin, of trimethylolpropane monoallyl ether to the finished polyacrylate resin, The olefinically unsaturated polyols, such as trimethylolpropane monoallyl ether in particular, may be employed as sole hydroxyl-containing monomers, but, in particular, proportionately in combination with others of the hydroxyl-containing monomers mentioned.

As component (a3) it is possible to employ any ethylenically unsaturated monomer which carries at least one carboxyl group per molecule and is copolymerizable with (a1), (a2), (a4), (a5) and (a6), or a mixture of such monomers. As component (a3) it is preferred to employ acrylic acid and/or methacrylic acid. However, it is also possible to employ other ethylenically unsaturated acids having up to 6 carbon atoms in the molecule. Examples of such acids are ethacrylic acid, crotonic acid, maleic acid, fumaric acid and itaconic acid. It is also possible to employ as component (a3) mono (meth) acryloyloxyethyl maleate, mono(meth) acryloyloxyethyl succinate and mono(meth) acryloyloxyethyl phthalate.

As component (a4), one or more vinyl esters of α-branched monocarboxylic acids having 5 to 18 carbon atoms in the molecule are employed. The branched monocarboxylic acids can be obtained by reacting formic acid or carbon monoxide and water with olefins in the presence of a liquid, strongly acidic catalyst; the olefins may be products of the cracking of paraffinic hydrocarbons, such as mineral oil fractions, and may contain both branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Examples of other olefinic starting materials are propylene trimer, propylene tetramer and diisobutylene. However, the vinyl esters can also be prepared in a manner known per se from the acids, for example by reacting the acid with acetylene. It is particularly preferred—owing to the ready availability—to employ vinyl esters of saturated aliphatic monocarboxylic acids, having 9 to 11 carbon atoms, which are branched at the α carbon atom.

As component (a5), the reaction product of acrylic acid is and/or methacrylic acid with the glycidyl ester of an α-branched monocarboxylic acid having 5 to 18 carbon atoms per molecule is employed. Glycidyl esters of highly branched monocarboxylic acids are obtainable under the trade name "Cardura". The reaction of acrylic or methacrylic acid with the glycidyl ester of a carboxylic acid having a tertiary α carbon atom can be carried out prior to, during or after the polymerization reaction. As component (a5) it is preferred to employ the reaction product of acrylic and/or methacrylic acid with the glycidyl ester of versatic acid. This glycidyl ester is obtainable commercially under the name "Cardura E10".

As component (a6), it is possible to employ all essentially carboxyl-free ethylenically unsaturated monomers which are copolymerizable with (a1), (a2), (a3), (a4) and (a5) and are different from $(a_1)$, $(a_2)$, (a3) and (a4), or mixtures of such monomers. It is preferred to employ as component (a6) vinylaromatic hydrocarbons such as styrene, α-alkylstyrene and vinyltoluene.

As component (a6) is also possible to employ, in combination with other monomers mentioned as being suitable as component (a6), polysiloxane macromonomers. Suitable polysiloxane macromonomers are those having a number-average molecular weight of from 1000 to 40,000, preferably from 2000 to 10,000, and on average from 0.5 to 2.5, preferably from 0.5 to 1.5, ethylenically unsaturated double bonds per molecule. Examples of suitable polysiloxane macromonomers are those described in DE-A 38 07 571 on pages 5 to 7, in DE-A 37 06 095 in columns 3 to 7, in EP-B 358 153 on pages 3 to 6 and in US-A 4,754,014 in columns 5 to 9. Also suitable are other acryloxysilane-containing vinyl monomers having the abovementioned molecular weights and contents of ethylenically unsaturated double bonds, for example compounds which can be prepared by reacting hydroxy-functional silanes with epichlorohydrin and then reacting the reaction product with methacrylic acid and/or hydroxyalkyl esters of (meth)acrylic acid.

It is preferred as component (a6) to employ polysiloxane macromonomers of the following formula:

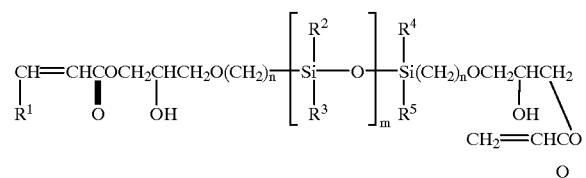

where $R^1$=H or $CH_3$ $R^{2,3}$, $R^4$, $R^5$=identical or different aliphatic hydrocarbon radicals having 1 to 8 carbon atoms, especially methyl, or phenyl radical.

n=from 2 to 5, preferably 3
m=from 8 to 30

It is particularly preferred to employ the α,ω-acryloxy organofunctional polydimethylsiloxane of the formula

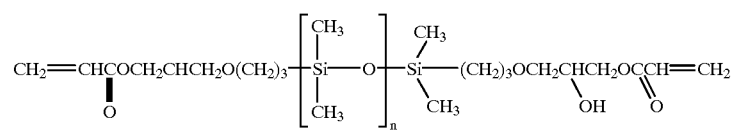

where n≈9, having an acryloxy equivalent of 550 g per equivalent, an OH number of 102 mg of KOH/g and a viscosity of 240 mPa·s (25° C.).

Other examples of polysiloxane macromonomers which are suitable as component (a6) are the compounds mentioned in the international patent application having the publication number WO 92/22615 on page 12, line 18, to page 18, line 10.

The quantity of the polysiloxane macromonomer(s) (a6) employed to modify the acrylate copolymers (A1) is less than 5% by weight, preferably from 0.05 to 2.5% by weight and with particular preference from 0.05 to 0.8% by weight, based in each case on the overall weight of the monomers which are employed to prepare the copolymer (A1).

The use of such polysiloxane macromonomers leads to an improvement in the slip of the aqueous polyurethane coating composition.

The nature and quantity of components (a1) to (a6) are selected such that the polyacrylate resin (A1) has the desired OH number, acid number and glass transition temperature. Acrylate resins which are employed with particular preference are obtained by polymerization of (a1) from 20 to 60% by weight, preferably from 30 to 50% by weight, of component $(a_1)$, (a2) from 10 to 40% by weight, preferably from 15 to 35% by weight, of component $(a_2)$, (a3) from 1 to 15% by weight, preferably from 2 to 8% by weight, of component (a3), (a4) from 0 to 25% by weight, preferably from 5 to 15% by weight, of component (a4), (a5) from 0 to 25% by weight, preferably from 5 to 15% by weight, of component (a5), and (a6) from 5 to 30% by weight, preferably from 10 to 20% by weight, of component (a6), the sum of the proportions by weight of components (a1) to (a6) being in each case 100% by weight.

The preparation of the polyacrylate resins (A1) employed in accordance with the invention is carried out in an organic solvent or solvent mixture and in the presence of at least one polymerization initiator. The organic solvents and polymerization initiators employed are those solvents and polymerization initiators which are customary for the preparation of polyacrylate resins and suitable for the preparation of aqueous dispersions. Examples of solvents which can be used are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, ethyl 2-hydroxypropionate and 3-methyl-3-methoxybutanol, and derivatives based on propylene glycol, for example ethyl ethoxypropionate, isopropoxypropanol, methoxypropyl acetate and the like. In this context it is also possible to prepare the polyacrylate resins (A1) first of all in a solvent which is not water-dilutable and to replace this solvent, after the polymerization, at least in part with a water-dilutable solvent.

Examples of polymerization initiators which can be used are initiators which form free radicals, for example t-butyl perethylhexanoate, benzoyl peroxide, azobisisobutyronitrile and t-butyl perbenzoate. The initiators are employed preferably in a quantity of from 2 to 25% by weight and with particular preference from 4 to 10% by weight, based on the overall weight of the monomers.

The polymerization is advantageously carried out at a temperature of from 80 to 160° C., preferably from 110 to 160° C. The solvents employed are preferably ethoxyethyl propionate and isopropoxypropanol.

The polyacrylate resin (A1) is preferably prepared by a two-stage process, since in this way the resulting aqueous coating compositions have better processing properties. It is preferred, therefore, to employ polyacrylate resins which are obtainable by I. polymerizing a mixture of (a1), (a2), (a4), (a5) and (a6) or a mixture of portions of components (a1), (a2), (a4), (a5) and (a6) in an organic solvent, II. after at least 60% by weight of the mixture composed of (a1), (a2), (a4), (a5) and if desired (a6) has been added, adding (a3) and any remaining portion of components (a1), (a2), (a4), (a5) and (a6) and continuing polymerization, and III. after the end of the polymerization, if desired, at least partially neutralizing the resulting polyacrylate resin.

In addition, however, it is also possible initially to charge components (a4) and/or (a5) together with at least a portion of the solvent and to meter in the remaining components. Furthermore, it is also possible to include in the initial charge only portions of components (a4) and/or (a5) together with at least one portion of the solvent, and to add the remainder of these components as described above. It is preferred, for example, initially to charge at least 20% by weight of the solvent and about 10% by weight of component (a4) and (a5) and, if desired, portions of components (a1) and (a6).

Also preferred is the preparation of the polyacrylate resins (A1) which are employed in accordance with the invention by a two-stage process in which stage (I) lasts from 1 to 8 hours, preferably from 1.5 to 4 hours, and the addition of the mixture of (a3) and any remaining portion of components $(a_1)$, $(a_2)$, (a4), (a5) and (a6) is made over a period of from 20 to 120 min, preferably over a period of from 30 to 90 min. When the addition of the mixture of (a3) and any remaining portion of components (a1), (a2), (a4), (a5) and (a6) is complete, polymerization is continued until all the monomers employed have undergone essentially complete reaction.

The quantity and rate of addition of the initiator is preferably chosen such that a polyacrylate resin (A1) having a number-average molecular weight of from 1000 to 30,000 is obtained. It is preferred to commence the addition of initiator some time, in general about 15 minutes, before adding the monomers. A further preferred procedure is one in which the addition of initiator is commenced at the same time as the addition of the monomers and is terminated about half an hour after the addition of the monomers has been ended. The initiator is preferably added in a constant quantity per unit time. When the addition of initiator has ended, the reaction mixture is maintained at polymerization temperature for a time (generally 1½ h) until all the monomers employed have undergone essentially complete reaction. "Essentially complete reaction" is intended to denote that preferably 100% by weight of the monomers employed has been reacted, but that it is also possible for a small proportion of residual monomer, of no more than up to about 0.5 by weight, based on the weight of the reaction mixture, possibly to remain unreacted.

For the preparation of the polyacrylate resins (A1), the monomers are preferably polymerized at a polymerization solids content which is not too high, preferably at a polymerization solids content of from 70 to 50% by weight, and then the solvents are removed partially by distillation, so that the polyacrylate resin solutions formed have a solids content of preferably from 80 to 60% by weight.

Suitable hydroxyl- and carboxyl-containing polyesters (A2) are all polyesters having the stated OH numbers, acid numbers and molecular figures. It is preferred to employ polyesters which, as a 50% strength solution in ethoxyethyl propionate, have a viscosity at 23° C. of $\leq 2.0$ dPa·s, preferably a viscosity of $\leq 1.0$ dPa·s.

Preference is given to the employment, as component (A2), of polyesters which are obtainable by reaction of p1) polycarboxylic acids or ester if table derivatives thereof, together if desired with monocarboxylic acids, p2) polyols, together if desired with monools, p3) if desired, further modifying components, and p4) if desired, a component which is reactive with the reaction product of (p1), (p2) and, if appropriate, (p3).

Examples of polycarboxylic acids which can be employed as component (p1) are aromatic, aliphatic and cycloaliphatic polycarboxylic acids. As component (p1) it is preferred to employ aromatic and/or aliphatic polycarboxylic acids.

Examples of suitable polycarboxylic acids are phthalic acid, isophthalic acid, terephthalic acid, halophthalic acids, such as tetrachloro- or tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylene tetrahydrophthalic acid, tricyclodecanedicarboxylic acid, endoethylenehexahydrophthalic acid, camphoric acid, cyclohexanetetracarboxylic acid, cyclobutanetetracarboxylic acid, etc. The cycloaliphatic polycarboxylic acids can be employed both in their cis and their trans form and as a mixture of the two forms. Also suitable are the esterifiable derivatives of the abovementioned polycarboxylic acids, for example their mono- or polyvalent esters with aliphatic alcohols having 1 to 4 carbon atoms or hydroxy alcohols having 1 to 4 carbon atoms. Furthermore, it is also possible to employ the anhydrides of the abovementioned acids, where they exist.

It is also possible, if desired, to employ together with the polycarboxylic acids monocarboxylic acids, examples being benzoic acid, tert-butylbenzoic acid, lauric acid, isononanoic acid and fatty acids of naturally occurring oils. A preferred monocarboxylic acid is isononanoic acid.

Alcohol components (p2) which are suitable for the preparation of the polyester (A2) are polyhydric alcohols, such as ethylene glycol, propanediols, butanediols, hexanediols, neopentyl hydroxypivalate, neopentyl glycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, trishydroxyethyl isocyanate, polyethylene glycol, polypropylene glycol, together if desired with monohydric alcohols such as, for example, butanol, octanol, lauryl alcohol, ethoxylated and/or propoxylated phenols.

Particularly suitable as component (p3) for the preparation of the polyesters (A2) are compounds which have a group which is reactive toward the functional groups of the polyester, with the exception of the compounds specified as component (p4). As modifying component (p3) it is preferred to use polyisocyanates and/or diepoxide compounds, and also, if desired, monoisocyanates and/or monoepoxide compounds. Examples of suitable components (p3) are described in DE-A-40 24 204 on page 4, lines 4 to 9.

As component (p4) for the preparation of the polyesters (A2), suitable compounds are those having, in addition to a group which is reactive toward the functional groups of the polyester (A2), a tertiary amino group, for example monoisocyanates having at least one tertiary amino group or mercapto compounds having at least one tertiary amino group. For details, reference is made to DE-A 40 24 204, page 4, lines 10 to 49.

The polyesters (A2) are prepared by the known methods of esterification, as described, for example, in DE-A-40 24 204, page 4, lines 50 to 65.

In this case the reaction is conventionally carried out at temperatures of between 180 and 280° C., if desired in the presence of a suitable esterification catalyst such as, for example, lithium octoate, dibutyltin oxide, dibutyltin dilaurate, para-toluenesulfonic acid and the like.

The preparation of the polyesters (A2) is customarily carried out in the presence of small quantities of a suitable solvent as entraining agent. Examples of entraining agents which are employed are aromatic hydrocarbons such as, in particular, xylene, and (cyclo)aliphatic hydrocarbons, for example cyclohexane.

It is particularly preferred to employ as component (A2) polyesters which have been prepared by a two-stage process by first of all preparing a hydroxyl-containing polyester having an OH number of from 100 to 300 mg of KOH/g, an acid number of less than 10 mg of KOH/g and a number-average molecular weight of from 500 to 2000, which is then reacted in a second stage with carboxylic anhydrides to give the desired polyester (A2). In this context, the quantity of carboxylic anhydrides is selected such that the resulting polyester has the desired acid number. Suitable anhydrides for this reaction are all acid anhydrides which are customarily employed, for example hexahydrophthalic anhydride, trimellitic anhydride, pyromellitic anhydride, phthalic anhydride, tetrahydrophthalic anhydride, succinic anhydride and mixtures of these and/or other anhydrides and, in particular, anhydrides of aromatic polycarboxylic acids, such as trimellitic anhydride.

It is possible, if desired, for the polyacrylate resin (A1) to have been prepared at least partially in the presence of the polyester (A2). In this case it is advantageous to prepare at least 20% by weight and, with particular advantage, from 40 to 80% by weight of component (A1) in the presence of component (A2).

Any remaining quantity of component (A1) is subsequently added to the binder solution. In this case it is possible for this already polymerized resin to have the same monomer composition as the polyacrylate resin synthesized in the presence of the polyester. However, it is also possible to add a hydroxyl-containing polyacrylate resin having a different monomer composition. Furthermore, it is possible to add a mixture of different polyacrylate resins and/or polyesters, in which, if desired, one resin has the same monomer composition as the polyacrylate resin synthesized in the presence of the polyester.

Suitable hydroxyl- and carboxyl-containing polyurethane resins (A3) are all polyurethane resins having the stated OH numbers, acid numbers and molecular figures. It is preferred to employ polyurethane resins which, as a 50% strength solution in ethoxyethyl propionate, have a viscosity at 23° C. of ≦5.0 dPa·s, preferably a viscosity of ≦3.5 dPa·s.

Examples of suitable polyurethane resins are described in the following documents: EP-A-355 433, DE-A-35 45 618, DE-A-38 13 866, DE-A-32 10 051, DE-A-26 24 442, DE-A-37 39 332, U.S. Pat. No. 4,719,132, EP-A-89 497, U.S. Pat. No. 4,558,090, U.S. Pat. No. A-4,489,135, DE-A-36 28 124, EP-A-158 099, DE-A-29 26 584, EP-A-195 931, DE-A-33 21 180 and DE-A-40 05 961.

In component (I) it is preferred to employ polyurethane resins which can be prepared by reacting isocyanto-containing prepolymers with compounds which are reactive toward isocyanate groups.

The preparation of isocyanato-containing prepolymers can be carried out by reaction of polyols having a hydroxyl number of from 10 to 1800, preferably from 50 to 1200 mg of KOH/g, with excess polyisocyanates at temperatures of up to 150° C., preferably from 50 to 130° C., in organic solvents which are not able to react with isocyanates. The ratio of equivalents of NCO to OH groups is between 2.0:1.0 and >1.0:1.0, preferably between 1.4:1 and 1.1:1.

The polyols employed for the preparation of the prepolymer may be of low molecular weight and/or high molecular weight and may contain slow-to-react anionic groups or groups capable of forming anions. It is also possible to use low molecular weight polyols having a molecular weight of from 60 up to 400 in order to prepare the isocyanato-containing prepolymers. In this case, quantities of up to 30% by weight of the overall polyol components, preferably from about 2 to 20% by weight, are employed.

In order to obtain an NCO prepolymer of high flexibility, a high proportion of a predominantly linear polyol should be added, having a preferred OH number of from 30 to 150 mg of KOH/g. Up to 97% by weight of the overall polyol may be composed of saturated and unsaturated polyesters and/or polyethers having a molecular mass Mn of from 400 to 5000. The polyetherdiols selected should not introduce any excessive quantities of ether groups, since otherwise the polymers formed swell in water. Polyester diols are prepared by esterification of organic dicarboxylic acids or anhydrides thereof with organic diols, or are derived from a hydroxy-carboxylic acid or a lactone. In order to prepare branched polyester polyols it is possible to employ to a minor extent polyols or polycarboxylic acids having a relatively high functionality.

Preferably, the alcohol component employed for the preparation of the polyurethane resins consists at least to a certain proportion of ($a_1$) at least one diol of the formula (I)

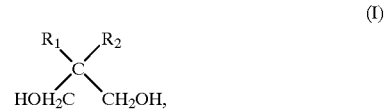

(I)

in which $R_1$ and $R_2$ are each an identical or different radical and are an alkyl radical of 1 to 18 carbon atoms, an aryl radical or a cycloaliphatic radical, with the proviso that $R_1$ and/or $R_2$ may not be methyl, and/or ($a_2$) at least one diol of the formula (II)

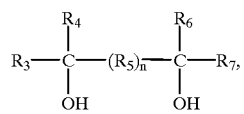

in which $R_3$, $R_4$, $R_6$ and $R_7$ are each identical or different radicals and are an alkyl radical of 1 to 6 carbon atoms, a cycloalkyl radical or an aryl radical, and RS is an alkyl radical of 1 to 6 carbon atoms, an aryl radical or an unsaturated alkyl radical of 1 to 6 carbon atoms, and n is either 0 or 1.

As component (($a_1$)), suitable propanediols of the formula (I) are all those in which either $R_1$ or $R_2$ or $R_1$ and $R_2$ is not methyl, examples being 2-butyl-2-ethylpropane-1,3-diol, 2-phenyl-2-methylpropane-1,3-diol, 2-propyl-2-ethylpropane-1,3-diol, 2,2-di-tert-butylpropane-1,3-diol, 2-butyl-2-propylpropane-1,3-diol, 1-dihydroxymethyl-bicyclo[2.2.1]heptane, 2,2-diethyl-propane-1,3-diol, 2,2-dipropylpropane-1,3-diol, 2-cyclohexyl-2-methylpropane-1,3-diol etcetera.

As component (($a_2$)) it is possible to employ, for example, 2,5-dimethylhexane-2,5-diol, 2,5-diethyl-hexane-2,5-diol, 2-ethyl-5-methylhexane-2,5-diol, 2,4-dimethylpentane-2,4-diol, 2,3-dimethylbutane-2,3-diol, 1,4-(2'-hydroxypropyl)benzene and 1,3-(2'-hydroxypropyl)benzene.

It is preferred to employ, as component ($a_1$), 2-propyl-2-ethylpropane-1,3-diol, 2,2-diethylpropane-1,3-diol, 2-butyl-2-ethylpropane-1,3-diol and 2-phenyl-2-ethyl-propane-1,3-diol and, as component ($a_2$), 2,3-dimethylbutane-2,3-diol and 2,5-dimethylhexane-2,5-diol. It is particularly preferred to employ, as component ($a_1$), 2-butyl-2-ethylpropane-1,3-diol and 2-phenyl-2-ethylpropane-1,3-diol and, as component (($a_2$)), 2,5-dimethylhexane-2,5-diol. Components ($a_1$) and/or (($a_2$)) are customarily employed in a quantity of from 0.5 to 15% by weight, preferably from 1 to 7% by weight, based in each case on the overall weight of the synthesis components employed for the preparation of the polyurethane resins.

As typical multifunctional isocyanates for the preparation of the polyurethane resins, use is made of aliphatic, cycloaliphatic and/or aromatic polyisocyanates having at least two isocyanate groups per molecule. The isomers or isomer mixtures of organic diisocyanates are preferred. Owing to their good resistance to ultraviolet light, (cyclo) aliphatic diisocyanates give rise to products having a low is tendency toward yellowing. The polyisocyanate component used to form the prepolymer may also contain a proportion of more highly functional polyisocyanates, provided that this does not cause any gelling. Triisocyanates which have proven suitable are products formed by trimerization or oligomerization of diisocyanates or by reaction of diisocyanates with polyfunctional OH-or NH-containing compounds. The average functionality can be lowered, if desired, by addition of monoisocyanates.

Examples of polyisocyanates which can be employed are phenylene diisocyanate, toluylene diisocyanate, xylylene diisocyanate, bisphenylene diisocyanate, naphthylene diisocyanate, diphenylmethane diisocyanate, isophorone diisocyanate, cyclobutane diisocyanate cyclopentylene diisocyanate, cyclohexylene diisocyanate, methylcyclohexylene diisocyanate, dicyclohexylmethane diisocyanate, ethylene diisocyanate, trimethylene diisocyanate, tetramethylene diisocyanate, pentamethylene diisocyanate, hexamethylene diisocyanate, propylene diisocyanate, ethylethylene diisocyanate and trimethylhexane diisocyanate.

For the preparation of high-solids polyurethane resin solutions, use is made in particular of diisocyanates of the general formula (III)

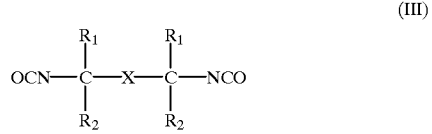

in which X is a divalent, aromatic hydrocarbon radical, preferably an optionally halogen-, methyl- or methoxy-substituted naphthylene, diphenylene or 1,2-, 1,3-or 1,4-phenylene radical, particularly preferably a 1,3-phenylene radical, and $R_1$ and $R_2$ are an alkyl radical of 1–4 carbon atoms, preferably a methyl radical. Diisocyanates of the formula (III) are known (their preparation is described, for example, in EP-A-101 832, U.S. Pat. No. 3,290,350, U.S. Pat. No. 4,130,577 and U.S. Pat. No. 4,439,616) and some are obtainable commercially (1,3-bis(2-isocyanatoprop-2-yl)benzene, for example, is sold by the American Cyanamid Company under the trade name TMXDI (META)®).

Polyurethanes are generally not compatible with water unless in the course of their synthesis specific constituents are incorporated and/or particular preparation steps are undertaken. Thus, for the preparation of the polyurethane resins, it is possible to use compounds which contain two H-active groups which are reactive with isocyanate groups, and at least one group which ensures dispersibility in water. Suitable groups of this kind are nonionic groups (eg. polyethers), anionic groups, mixtures of these two groups or cationic groups.

It is thus possible to incorporate into the polyurethane resin an acid number which is sufficient for the neutralized product to give a stable dispersion in water. Compounds used for this purpose contain at least one group which is reactive toward isocyanate groups and at least one group which is capable of forming anions. Suitable groups which are reactive toward isocyanate groups are, in particular, hydroxyl groups and primary and/or secondary amino groups. Groups capable of forming anions are carboxyl, sulfonic acid and/or phosphonic acid groups. Preference is given to the employment of alkanoic acids having two substituents on the α carbon atom. The substituent may be a hydroxyl group, an alkyl group or an alkylol group. These polyols have at least one, generally from 1 to 3, carboxyl groups in the molecule. They have from two to about 25, preferably from 3 to 10, carbon atoms. The carboxyl group-containing polyol may make up from 3 to 100% by weight, preferably from 5 to 50% by weight, of the overall polyol constituent in the NCO prepolymer.

The quantity of ionizable carboxyl groups which is available in salt form owing to the neutralization of the carboxyl groups is generally at least 0.4% by weight, preferably at least 0.7% by weight, based on the solids content. The upper limit is about 12% by weight. The quantity of dihydroxyalkanoic acids in the unneutralized prepolymer gives rise to an acid number of at least 5, preferably at least 10. In the case of very low acid numbers, further measures are generally necessary in order to achieve dispersibility in water.

The upper limit of the acid number is at 150, preferably at 40 mg of KOH/g, based on the solids content. The acid number is preferably within the range from 20 to 40 mg of KOH/g.

The isocyanate groups of the isocyanato-containing prepolymer are reacted with a modifying agent. In this context, the modifying agent is preferably added in a quantity such that chain extensions, and thus increases in molecular weight, occur. Preferred modifying agents are organic compounds containing hydroxyl and/or secondary and/or primary amino groups, in particular di-, tri- and/or more highly functional polyols. Examples of polyols which can be employed are trimethylolpropane, 1,3,4 butanetriol, glycerol, erythritol, mesoerythritol, arabitol, adonitol, etc. It is preferred to employ trimethylolpropane.

In order to prepare the polyurethane resin according to the invention it is preferred first of all to prepare an isocyanato-containing prepolymer from which the desired polyurethane resin is then prepared by further reaction, preferably chain extension. In this context, the reaction of components (a), (b), (c) and (d) is carried out according to the well-known methods of organic chemistry (cf. eg. Kunststoff-Handbuch [Plastics Handbook], Volume 7: Poly-urethane [Polyurethanes], edited by Dr. Y. Oertel, Karl-Hanser-Verlag, Munich, Vienna 1983), the reaction of the components preferably being carried out in a stepwise procedure (eg. formation of a first intermediate from components (a), (b), and (c) which is then reacted with (d) to give a second intermediate). However, it is also possible to react components (a), (b), (c) and (d) simultaneously. Examples of the preparation of the prepolymers are described in DE-A 26 24 442 and DE-A 32 10 051. In addition, however, it is also possible to prepare the polyurethane resins by reacting components (a), (b), (c), (d) and (e) simultaneously. The preparation of the polyurethane resins can be carried out by the known methods (eg. acetone method).

Components (a), (b), (c) and (d) are preferably reacted, however, in ethoxyethyl propionate (EEP) as solvent. In this context, the quantity of ethoxyethyl propionate may vary within wide limits and should be sufficient to form a prepolymer solution of appropriate viscosity. In general up to 70% by weight, preferably from 5 to 50% by weight and with particular preference less than 20!k by weight of solvent is employed, based on the solids content. Thus the reaction can be carried out, for example, in a very particularly preferred manner at a solvent content of 10–15% by weight of EEP, based on the solids content.

The reaction of components (a), (b), (c) and (d) can be carried out, if desired, in the presence of a catalyst, such as organotin compounds and/or tertiary amines. For the preparation of the prepolymers, the quantities of components (a), (b), (c) and (d) are selected such that the ratio of equivalents of NCO to OH groups is between 2.0:1.0 and >1.0:1.0, preferably between 1.4:1 and 1.1:1.

The NCO prepolymer contains at least about 0.5% by weight of isocyanate groups, preferably at least 1% by weight of NCO, based on the solids content. The upper limit is at about 15% by weight, preferably 10% by weight, particularly preferably at 5% by weight of NCO.

Suitable components (A4) are all water-dilutable binders which are compatible with the other constituents of component (I), examples being acrylicized polyurethane resins and/or polyesteracrylates.

Component (I) preferably comprises as binder (A)
(A1) at least 50% by weight, preferably at least 80% by weight, of at least one acrylate copolymer (A1),
(A2) from 0 to 30% by weight, preferably from 5 to 20% by weight, of at least one polyester (A2), and
(A3) from 0 to 30% by weight, preferably from 5 to 20% by weight, of at least one polyurethane resin (A3), and
(A4) from 0 to 10% by weight, preferably from 0 to 5% by weight, of at least one further binder (A4), the sum of the proportions by weight of components (A1) to (A4) being in each case 100% by weight.

Component (I) can contain as constituent (B) all pigments which are conventional in coatings. In this context, it is possible to employ both the pigments which are customary in aqueous coating compositions, which do not react with water and/or do not dissolve in water, and the pigments which are customarily employed in conventional coating compositions. The pigments may consist of inorganic or organic compounds and may impart a special effect and/or color. The coating composition according to the invention therefore ensures, on the basis of this large number of suitable pigments, a universal spectrum of use of the coating compositions, and enables the realization of a large number of colors.

Special-effect pigments which can be employed are metal flake pigments, such as commercial aluminum bronzes, aluminum bronzes chromatized in accordance with DE-A-36 36 183, and commercial stainless-steel bronzes and also nonmetallic effect pigments, for example pearlescent or interference pigments. Examples of suitable inorganic color-imparting pigments are titanium dioxide, iron oxides, Sicotrans Yellow and carbon black. Examples of suitable organic color-imparting pigments are Indanthrene Blue, Cromophthal Red, Irgazine Orange and Heliogen Green.

As constituent (C) component (I) contains at least one organic, water-dilutable solvent and, if desired, further solvents. Examples of suitable solvents are, in particular, water-miscible solvents, for example alcohols, esters, ketones, keto esters, glycol ether esters and the like. Those employed preferably are esters, alcohols and glycol ethers, particularly preferably ethoxyethyl propionate and isopropoxypropanol.

As constituent (D) component (I) contains at least one neutralizing agent. Examples of suitable neutralizing agents are ammonia and amines, for example trimethylamine, triethylamine, tributylamine, dimethylaniline, diethylaniline, triphenylamine, dimethylethanolamine, diethylethanolamine, methyldiethanolamine, triethanolamine and the like. The neutralization may take place in organic phase or in aqueous phase. The neutralizing agent preferably employed is dimethylethanolamine.

The quantity of neutralizing agent employed overall in the coating composition according to the invention is selected such that from 1 to 100 equivalents, preferably from 50 to 90 equivalents, of the carboxyl groups of the binder (A) are neutralized.

In this context, the neutralizing agent can be added to component (I) and/or (II) and/or (III) and/or (IV). Preferably, however, the neutralizing agent is added to component (I) and/or (III).

As constituent (E) component (I) may contain at least one rheology-controlling additive. Examples of rheology-controlling additives are: crosslinked polymeric microparticles, as disclosed for example in EP-A-38 127, inorganic phyllosilicates, for example aluminum-magnesium silicates, sodium-magnesium phyllosilicates and sodium-magnesium-fluorine-lithium phyllosilicates of the montmorillonite type, and synthetic polymers having ionic and/or associative groups, such as polyvinyl alcohol, poly(meth)acrylamide, poly(meth)acrylic acid, polyvinylpyrrolidone, styrene-maleic anhydride or ethylene-maleic anhydride copolymers and derivatives thereof, or else hydrophobically modified, ethoxylated urethanes or polyacrylates. It is preferred as rheology-controlling additives to employ inorganic phyllosilicates.

It is particularly preferred, in cases in which an inorganic phyllosilicate is employed as rheologycontrolling additive, for the inorganic phyllosilicate to be present exclusively in the coating component (III).

Furthermore, component (I) may contain at least one further conventional coatings additive. Examples of such additives are antifoams, dispersing aids, emulsifiers, and leveling auxiliaries.

It is of course also possible for the additives mentioned to be added separately to the coating composition. In this case the additives are then referred to as component (IV).

For the preparation of the coating compositions according to the invention, it is preferred to employ components (I) which comprise (A) from 20 to 90% by weight, preferably from 35 to 80% by weight, of the binder (A), (B) from 0 to 60% by weight, preferably from 5 to 50% by weight, of at least one pigment and/or filler, (C) from 5 to 50% by weight, preferably from 10 to 40% by weight, of at least one organic, water-dilutable solvent, and (D) from 0 to 20% by weight, preferably from 2 to 10% by weight, of at least one neutralizing agent, (E) from 0 to 20% by weight, preferably from 2 to 10% by weight, of at least one conventional auxiliary and/or additive, the sum of the proportions by weight of components (A) to (E) being in each case 100% by weight.

It is essential to the invention that the coating component (II) comprises as crosslinking agent at least one nonblocked di- and/or polyisocyanate (F1) which is, if desired, dissolved or dispersed in one or more organic, water-dilutable solvents, and, if desired, at least one further crosslinking agent selected from at least one epoxide compound (F2) having at least two epoxide groups per molecule and/or at least one amino resin (F3).

The polyisocyanate component (F1) may be any desired organic polyisocyanates having free isocyanate groups attached to aliphatic, cycloaliphatic, araliphatic and/or aromatic moieties. Preference is given to employing polyisocyanates having 2 to 5 isocyanate groups per molecule and having viscosities of from 100 to 2000 mPas (at 23° C.). If desired, small quantities of organic solvent, preferably from 1 to 25% by weight, based on pure polyisocyanate, may also be added to the polyisocyanates, in order thus to improve the ease of incorporation of the isocyanate and, if desired, to reduce the viscosity of the polyisocyanate to a value within the abovementioned ranges. Examples of solvents suitable as additives for the polyisocyanates are ethoxyethyl propionate, butyl acetate and the like.

Examples of suitable isocyanates are described, for example, in "Methoden der organischen Chemiel" [Methods of Organic Chemistry], Houben-Weyl, Volume 14/2, 4th Edition, George Thieme Verlag, Stuttgart 1963, page 61 to 70, and by W. Siefken, Liebigs Ann. Chem. 562, 75 to 136. Suitable examples are the isocyanates mentioned in the context of the description of the polyurethane resins (A3).

It is also possible to employ polyisocyanates which contain isocyanurate groups and/or biuret groups and/or allophanate groups and/or urethane groups and/or urea groups. Polyisocyanates containing urethane groups are obtained, for example, by reacting some of the isocyanate groups with polyols, for example trimethylolpropane and glycerol.

It is preferred to employ aliphatic or cycloaliphatic polyisocyanates, especially hexamethylene diisocyanate, dimerized and trimerized hexamethylene diisocyanate, isophorone diisocyanate, dicyclohexylmethane 2,4'-diisocyanate or dicyclohexylmethane 4,4'-diiso-cyanate or mixtures of these polyisocyanates. Very particular preference is given to the use of mixtures of polyisocyanates, containing uretdione and/or isocyanurate groups and/or allophanate groups, based on hexamethylene diisocyanate, as are formed by catalytic oligomerization of hexamethylene diisocyanate using suitable catalysts. The polyisocyanate component (B) may otherwise also be composed of any desired mixtures of the polyisocyanates specified by way of example.

The polyisocyanate component (F1) is employed in the coating compositions according to the invention advantageously in a quantity of at least 70% by weight, particularly preferably in a quantity of from 80 to 100% by weight, based on the overall weight of the crosslinking agent (F).

Examples of suitable polyepoxides (F2) are all known aliphatic and/or cycloaliphatic and/or aromatic polyepoxides, based for example on bisphenol A or bisphenol F.

Suitable examples of component (F2) include the polyepoxides which are obtainable commercially under the names Epikote® from Shell or Denacol from Nagase Chemicals Ltd., Japan, for example Denacol EX-411 (pentaerythritol polyglycidyl ether), Denacol EX-321 (trimethylolpropane polyglycidyl ether), Denacol EX-512 (polyglycerol polyglycidyl ether) and Denacol EX-521 (polyglycerol polyglycidyl ether).

In the coating compositions according to the invention, the polyepoxide component (F2) is advantageously employed in a quantity of from 0 to 30% by weight, particularly preferably in a quantity of from 2 to 20% by weight, based on the overall weight of the crosslinking agent (F).

Examples of suitable amino resins (F3) are iminofunctional melamine resins such as the products obtainable commercially under the name Cymel® 325 from Cyanamid and Luwipal® LR 8839 from BASF AG.

The amino resin (F3) is employed in the coating compositions according to the invention advantageously in a quantity of from 0 to 30% by weight, particularly preferably in a quantity of from 2 to 20% by weight, based on the overall weight of the crosslinking agent (F).

Constituents (G) and (H) of coating component (II) correspond to constituents (C) and (E) of coating component (I).

In order to prepare the coating compositions according to the invention, it is preferred to employ components (II) which comprise (F) from 50 to 100% by weight, preferably from 60 to 90% by weight, of at least one crosslinking agent (F), (G) from 0 to 50% by weight, preferably from 10 to 40% by weight, of at least one organic, water-miscible solvent, and (H) from 0 to 20% by weight, preferably from 0 to 10% by weight, of at least one conventional auxiliary and/or additive, the sum of the proportions by weight of components (F) to (H) being in each case 100% by weight.

Constituents (J) and (K) of coating component (III) correspond to constituents (D) and (E) of coating component (I).

In order to prepare the coating compositions according to the invention, it is preferred to employ components (III) which comprise (I) from 80 to 100% by weight, preferably from 80 to 95% by weight, of water, (J) from 0 to 20% by weight, preferably from 2 to 10% by weight, of at least one neutralizing agent, and (K) from 0 to 20% by weight, preferably from 2 to 10% by weight, of at least one conventional auxiliary and/or additive, (L) from 0 to 20% by weight, preferably from 0 to 10% by weight, of at least one emulsion polymer, the sum of the proportions by weight of components (I) to (L) being in each case 100% by weight.

In order to prepare the coating compositions according to the invention, it is preferred to employ components (IV) which are composed of a portion or of the entire quantity of the auxiliaries and additives employed in the coating composition.

To prepare the coating compositions, components (I) and (II) are preferably employed in quantities such that the ratio of equivalents of hydroxyl groups of the binder (A) to the crosslinking groups of the crosslinking agent (F) is between 1:2 and 2:1, preferably between 1:1.2 and 1:1.5. Furthermore, the coating compositions according to the invention preferably have an overall content of conventional coatings additives of from 0 to 10% by weight; of organic solvents, from 5 to 25% by weight, preferably from 10 to 20% by weight; of water, from 25 to 70% by weight, preferably from 30 to 60% by weight; of binder, from 15 to 50% by weight, preferably from 20 to 40% by weight; of crosslinking agent, from 5 to 30% by weight, preferably from 10 to 20% by weight; and of pigments and/or fillers, from 0 to 50% by weight, preferably from 0 to 30% by weight, based in each case on the overall weight of the coating composition.

Component (I) is prepared by methods known to the person skilled in the art, by mixing and, if desired, dispersing the individual constituents. Thus, for example, the incorporation of color-imparting pigments is conventionally carried out by dispersing the respective pigments in one or more binders. Pigment dispersion is carried out with the aid of customary apparatus, for example bead mills and sand mills.

The special-effect pigments are customarily incorporated by homogeneous mixing of the specialeffect pigments with one or more solvents. This mixture is then stirred into a mixture of one or more of the above-described binders, if desired with the addition of further organic solvents, by means of a stirrer or dissolver.

Components (II), (III) and, if appropriate, (IV) are likewise prepared by methods which are well-known to the person skilled in the art, by mixing and/or dispersing the individual constituents.

The coating compositions according to the invention can be prepared by all conceivable mixing methods from components (I), (II), (III) and, if appropriate, (IV). In this context, however, it is essential to the invention that in the course of the preparation of the coating compositions components (I), (II), (III) and, if appropriate, (IV) are mixed and, if desired, dispersed not until shortly before the application of the coating compositions.

Thus, for example, it is possible, in order to prepare the coating compositions according to the invention, first of all to mix components (I) and (II), in this case these components (I) and (II) preferably containing no neutralizing agent. Then, if desired, component (IV) is added to this mixture. One option is then to add the mixture thus obtained to component (III) containing neutralizing agent and to disperse the coating composition obtained. An alternative option is then to add component (III), containing neutralizing agent, to the mixture thus obtained.

Furthermore, the coating composition according to the invention can be prepared, for example, in analogy to the procedure just described, but with the neutralizing agent not being present in component (III) but instead being added separately prior to the addition of component (III).

Moreover, the coating composition according to the invention can also be prepared by first of all adding the neutralizing agent to component (I). Of course, it is possible instead of this mixing operation also to employ a component (I) which already contains the neutralizing agent. The component (I) obtained in this way is then either (i) mixed with component (II) and, if desired, component (IV) (simultaneously, or successive mixture with (II) and, if appropriate, (IV)), the mixture thus obtained is then either added to component (III) or has component (III) added to it, and the coating composition obtained in this way in each case is, in addition, homogenized by dispersion, or (ii) admixed with component (III) or added to component (III) and homogenized by dispersion, and then components (II) and, if desired, (IV) are added.

The coating compositions according to the invention are preferably prepared by mixing component (I), to which neutralizing agent has already been added, with component (II) and, if desired, component (IV), and then incorporating this mixture by dispersion into component (III).

The coating compositions according to the invention can be applied by conventional application methods, for example spraying, knife coating, brushing or dipping, to any desired substrates, for example metal, wood, plastic or paper.

The coating compositions according to the invention are customarily cured at temperatures below 120° C., preferably at temperatures of not more than 80° C.

The coating compositions according to the invention are preferably employed for the production of topcoats. The coating compositions according to the invention may be employed both in the production-line finishing and in the refinishing of motor-vehicle bodies. However, they are preferably employed in the area of refinishing.

The aqueous coating compositions according to the invention can be employed as fillers and for producing one-layer topcoats, and as pigmented basecoats or as clearcoats in a process for the production of a multilayer coating (basecoat/clearcoat method). The coating compositions according to the invention are preferably employed, however, as clearcoats.

The invention will now be illustrated in more detail on the basis of exemplary embodiments. All parts and percentages therein are by weight unless expressly stated otherwise.

EXAMPLES

Examples 1 to 14 and Comparative Examples 1 and 2

1. Preparation of a Water-Dilutable Acrylate Resin (A1) Employed in Accordance with the Invention 74 parts by weight of isopropoxypropanol are introduced into a steel vessel fitted with monomer feed, initiator feed, thermometer, oil heating and reflux condenser, and are heated to 120° C. A solution of 8.0 parts by weight of t-butyl perethylhexanoate in 6.0 parts by weight of ethoxyethyl propionate is then added at a rate such that the addition is concluded after 4 h 30 min. The commencement of the addition of the t-butyl perethylhexanoate solution is accompanied by the beginning of the addition of the monomer mixture of (a1), (a2), (a3) and (a6)

(a1) : 18.5 parts of n-butyl methacrylate 12.4 parts of methyl methacrylate, 10.0 parts of lauryl acrylate (commercial product Methacrylester 13 from Rhom [sic] AG, Darmstadt) 10.0 parts of cyclohexyl methacrylate (a6): 15.0 parts by weight of styrene (a2): 29.0 parts by weight of hydroxyethyl acrylate (a3): 5.1 parts by weight of acrylic acid.

The mixture (a1), (a2), (a3) and (a6) is added at a rate such that the addition is concluded after 4 hours. When the addition of the t-butyl perethylhexanoate solution is complete, the reaction mixture is maintained at 120° C. for a further 2 h. The reaction mixture is adjusted, by distillative removal of the organic solvent, to a solids content of 80%. The acrylate resin thus obtained has an OH number of 140 mg of KOH/g of solid resin, an acid number of 40 mg of KOH/g of solid resin, a number-average molecular weight of 2800 and a weight-average m6lecular weight of 8700. The viscosity of a 50% strength solution of the acrylate resin in ethbxyethyl propionate is 2.9 dPa·s (23° C.).

2. Preparation of an Aqueous Dispersion of the Acrylate Resin (VA1)

The preparation of the acrylate resin (VA1) is carried out in analogy to the preparation of the acrylate resin (A1). In contrast to the preparation of the acrylate resin (A1), however, adjustment of the solids content to 80% is followed by addition at 90° C. first of all of dimethylethanolamine (degree of neutralization: 85%) and then by addition of water to set a solids content of 40%. The organic solvent is removed by means of distillation under vacuum down to ≦3%. Using water, a final solids content of 40% is set.

3. Preparation of a Water-Dilutable Polyester (A2) Employed in Accordance with the Invention First of all 11.728 parts of hexane-1,6-diol, 40.543 parts of neopentyl hydroxypivalate, 6.658 parts of trimethylolpropane and 26.775 parts of hexahydrophthalic anhydride are heated at 230° C. in a reactor equipped with oil thermostat and stirrer. The entraining agent used is cyclohexane. After an acid number of ≦5 mg of KOH/g of solids has been reached, the mixture is cooled to 150° C. and 14.296 parts of trimellitic anhydride are added. The mixture is then heated to 190° C. and esterification is carried out at this temperature until an acid number of 30 mg of KOH/g of solid resin has been reached. The polyester resin is diluted with isopropoxypropanol to a solids content of 80%. The polyester obtained in this way has an OH number of 130 mg of KOH/g of solid resin and a number-average molecular weight of 1500 and also a weight-average molecular weight of 3800. The viscosity of a 500% strength solution of the polyester in ethoxyethyl propionate is 0.8 dPa·s (23° C.).

4. Preparation of a Polyurethane Resin (A3) Employed in Accordance with the Invention 4.1. Preparation of a Polyester Diol B In an apparatus conventional for polyester synthesis, 371.2 g of Pripol 1013 (commercial dimeric fatty acid having a monomer content of not more than 0.1%, a trimer content of not more than 2%, an acid number of from 195 to 198 mg of KOH/g and a hydrolysis number of 198–202 mg of KOH/g), 107.7 g of cyclohexanedimethanol, 723.3 g of neopentyl glycol hydroxypivalate, 17.2 g of ethylbutylpropanediol, 392.6 g of neopentyl glycol and 1018.7 g of isophthalic acid were reacted, with cyclohexane as agent and 0.25 g of monobutyltin oxide hydrate, to an acid number <5.0. The cyclohexane was removed by distillation and the polyester run up to an acid number of <1.5. The batch was cooled to about 100° C. and partially dissolved to 79.5% with ethoxyethyl propionate. The polyester diol B has an Mn of 2352 (measured by GPC against polystyrene standard) and a glass transition temperature (measured by DSC) of −16° C. The viscosity of a 60% strength solution in ethoxyethyl propionent [sic] at 23° C. is 3.5 dPa·s.

4.2. Preparation of the polyurethane resin (A3)

In a 5 l reaction vessel with stirrer and reflux condenser, a mixture of 728.9 g of the polyester diol B, 10.9 g of 2-butyl-2-ethylpropane-1,3-diol, 47.9 g of dimethylolpropionic acid and 241.9 g of tetramethylxylylene diisocyanate was heated at a reaction temperature of 115° C. until the mixture had reached a constant NCO value. Subsequently, 2.2 times the molar quantity of trimethylolpropane was added per mole of diisocyanate, and the mixture was reacted until the isocyanate content was virtually zero. The mixture was partially dissolved with 500 g of butoxypropanol, and 23.9 g of dimethylethanolamine were added in one portion at a temperature of 100° C. Finally, a solids content of 60% was set with butoxypropanol. The binder has an OH number of 60 mg of KOH/g and an acid number of 20.6 mg of KOH/g, and also a viscosity (10:3 in N-methylpyrrolidone) of 13.5 dPa·s. The number-average molecular weight is 4500, the weight-average molecular weight is 19,500. The viscosity of a 50% strength solution of the polyurethane in ethoxyethyl propionate is 4.1 dPa·s- (23° C.).

5. Preparation of the Coating Compositions of Examples 1 to 14 and of the Coating Compositions of Comparative Example V1

5.1. Preparation of Component (I)

Component (I) is prepared by mixing the constituents indicated in Table 1 using a stirrer (600 revolutions per minute).

5.2. Preparation of Component (II)

Component (II) is prepared by mixing the constituents indicated in Table 2 using a stirrer (600 revolutions per minute).

5.3. Preparation of Component (III)

Component (III) is prepared by mixing the constituents indicated in Table 3 using a stirrer (600 revolutions per minute).

5.4. Preparation of the Coating Compositions

The preparation of the coating compositions of Examples 1 to 5 was carried out by mixing the components indicated in Table 4 using a stirrer (600 revolutions per minute), by adding a mixture of components (I) and (II) to component (III).

The preparation of the coating compositions of Example 6 was carried out by mixing the components indicated in Table 4 using a stirrer (600 revolutions per minute), by first of all premixing components (I) and (II) and then adding component (III) to this mixture.

The preparation of the coating compositions of Examples 7 to 9 was carried out in analogy to the preparation of the coating compositions of Examples 2, 3 and 6, but with the difference that the components indicated in Table 4 were mixed by hand, ie. without the use of a stirrer.

The preparation of the coating compositions of Example 10 was carried out by mixing the components indicated in Table 4 using a stirrer (600 revolutions per minute), by taking component (III) as initial charge and then incorporating component (I) and, subsequently, component (II), in both cases by stirring.

The preparation of the coating compositions of Examples 11 to 14 was carried out by mixing the components indicated in Table 5 using a stirrer (600 revolutions per minute), by premixing components (I) and (II) and then stirring this preliminary mixture into component (III).

The preparation of the coating composition of Comparative Example 1 was carried out in analogy to the preparation of the coating composition of Example 1, with the difference that the acrylate resin (VA1) was employed instead of the acrylate resin (A1) and that no component (III) was added.

6. Preparation of the Coating Composition of Comparative Example V2

In accordance with the teaching of EP-A-368 499 and based on Examples 2, 7, 8, 13 and 14 of EP-A-368 499, the following examples were carried out in imitation:

6.1. Preparation of a Coating Dilution

In analogy to Example 2 of EP-A-368 499, 0.5 part by weight of p-toluenesulfonic acid was dissolved in 99.5 parts by weight of deionized water.

6.2. Preparation of a Component 1

A component 1 was prepared by mixing the following constituents:

65 parts by weight of a commercial polypropylene glycol having an average molecular weight of 400 and an OH number of ≈140 mg of KOH/g (commercial product PPG-400 from Union Carbide)

35 parts by weight of a commercial melamine-formaldehyde resin (commercial product Cymel 303 from Cyanamid)

0.5 part by weight of a commercial surface-active agent (commercial product Additive Byk 341 from Byk)

20 parts by weight of isopropanol

In addition, component 1 was also prepared by the process described in the description of EP-A-368 499 in column 6, lines 45 to 50, by first of all processing the polypropylene glycol, the melamine-formaldehyde resin and the isopropanol, with stirring, to give a mixture. The surface-active agent was then incorporated in this mixture with stirring.

6.3. Preparation of a Component 2

A component 2 was prepared from the following constituents:

65 parts by weight of triethylene glycol having a theoretical molecular weight of 150 and a theoretical OH number of 748

35 parts by weight of a commercial melamine-formaldehyde resin (commercial product Cymel 303 from Cyanamid)

0.5 part by weight of a commercial surface-active agent (commercial product Additive Byk 341 from Byk)

20 parts by weight of isopropanol

Component 2 was prepared in analogy to the preparation of component 1, by the 2 methods described therein.

6.4. Preparation of the Coating Compositions 1 and 2

140.5 parts by weight of component 1 or, respectively, 140.5 parts by weight of component 2 were mixed, with stirring, with 100 parts by weight of the coating dilution.

However, it was not possible to produce clearcoats, since the para-toluenesulfonic acid solution flocculated out and the mixture obtained was highly nonhomogeneous.

7.) Application of the Transparent Topcoat Compositions and Testing of the Baked Coating Films A water-dilutable basecoat composition pigmented with aluminum flakes, according to EP-A-279 813, is applied to a phosphatized steel panel coated with a commercial electrodeposition coating and a commercial filler, so as to give a dry film thickness of from 12 to 15 μm. The applied basecoat composition is dried for 10 min at room temperature and for 10 min at 60° C. A topcoat composition obtained as in section 6 is then sprayed onto the basecoat in 3 spray passes with a flash off time of 15 min in between. The panel is finally dried for 60 min at room temperature and baked for 30 min at 60° C. in a circulating-air oven. The multilayer coatings thus obtained were subjected to a number of tests. The test results are shown in Tables 6 and 7.

TABLE 1

Composition of component (I)

| Example | 1 | 2 | 3 | 4 | 5 | 6 | 7 | 8 | 9 | 10 | V1 |
|---|---|---|---|---|---|---|---|---|---|---|---|
| A1 (SC: 75%)[1] | 25 | 25 | 30 | 30 | 30 | 30 | 30 | 25 | 30 | 30 | — |
| A2 (SC: 850%)[1] | — | 5 | — | — | — | — | — | 5 | — | — | — |
| A3 (SC: 50%)[1] | 8 | — | — | — | — | — | — | — | — | — | — |
| VA1 (SC: 39%)[1] | — | — | — | — | — | — | — | — | — | — | 63.0 |
| DMEA[2] | 0 | — | 1.3 | — | — | — | — | — | 1.3 | — | 1.3 |
| Proglyde DMM[3] | 6.0 | 7.0 | 7.0 | 7.0 | 7.0 | 7.0 | 7.0 | 7.0 | 7.0 | 7.0 | 4.0 |
| Byk 331[4] | 0.05 | 0.05 | 0.05 | 0.05 | 0.05 | 0.05 | 0.05 | 0.05 | 0.05 | 0.05 | 0.05 |
| Tegoflow 425[5] | 0.05 | 0.05 | 0.05 | 0.05 | 0.05 | 0.05 | 0.05 | 0.05 | 0.05 | 0.05 | 0.05 |
| Σ | 39.1 | 37.1 | 38.4 | 37.1 | 37.1 | 37.1 | 37.1 | 37.1 | 38.4 | 37.1 | 68.4 |

[1]Acrylate resin solution or acrylate dispersion
[2]Dimethylethanolamine
[3]Commercial dipropylene glycol dimethyl ether from Dow Chemical Company
[4]Leveling additive based on a polyether-modified dimethylpolysiloxane copolymer from Byk
[5]Commercial additive based on a Polysiloxane polyether copolymer from Goldschmidt

TABLE 2

Composition of component (II)

| Example | 1 | 2 | 3 | 4 | 5 | 6 | 7 | 8 | 9 | 10 | V1 |
|---|---|---|---|---|---|---|---|---|---|---|---|
| Desmodur VPLS-2102[1] (Bayer AG) | 7.8 | 7.8 | 7.8 | — | 3.9 | 7.8 | 7.8 | 7.8 | 7.8 | 7.8 | 15.4 |

TABLE 2-continued

Composition of component (II)

| Example | 1 | 2 | 3 | 4 | 5 | 6 | 7 | 8 | 9 | 10 | V1 |
|---|---|---|---|---|---|---|---|---|---|---|---|
| Tolonate HDTLV[2] (Rhone Poulenc) | 6.9 | 6.9 | 6.9 | 13.8 | 10.4 | 6.9 | 6.9 | 6.9 | 6.9 | 6.9 | — |
| Proglyde DMM[3] | 1.6 | 1.6 | 1.6 | 2.5 | 2.0 | 1.6 | 1.6 | 1.6 | 1.6 | 1.6 | 3.8 |
| Σ | 16.3 | 16.3 | 16.3 | 16.3 | 16.3 | 16.3 | 16.3 | 16.3 | 16.3 | 16.3 | 19.2 |

[1] Commercial isocyanate based on a hexamethylene diisocyanate allophanate from Bayer AG
[2] Commercial isocyanate based on a hexamethylene diisocyanate trimer of low viscosity, from Rhône-Poulenc
[3] Commercial dipropylene glycol dimethyl ether from Dow Chemical Company

TABLE 3

Composition of component (III)

| Example | 1 | 2 | 3 | 4 | 5 | 6 | 7 | 8 | 9 | 10 | V1 |
|---|---|---|---|---|---|---|---|---|---|---|---|
| Water | 41.6 | 43.6 | 43.6 | 43.6 | 43.6 | 43.6 | 43.6 | 43.6 | 43.6 | 43.6 | 10.7 |
| DMEA[1] | 1.3 | 1.3 | — | 1.3 | 1.3 | 1.3 | 1.3 | 1.3 | — | 1.3 | — |
| Dapral T210[2] (10% strength) | 1.7 | 1.7 | 1.7 | 1.7 | 1.7 | 1.7 | 1.7 | 1.7 | 1.7 | 1.7 | 1.7 |
| Σ | 44.6 | 46.6 | 45.3 | 46.6 | 46.6 | 46.6 | 46.6 | 46.6 | 45.3 | 46.6 | 12.4 |

[1] Dimethylethanolamine
[2] Commercial, nonionic polyurethane thickener (10% strength in water) from Akzo

TABLE 4

Composition of the coating compositions

| Component | 1 | 2 | 3 | 4 | 5 | 6 | 7 | 8 | 9 | 10 | V1 |
|---|---|---|---|---|---|---|---|---|---|---|---|
| I | 39.1 | 37.1 | 38.4 | 37.1 | 37.1 | 37.1 | 37.1 | 37.1 | 38.4 | 37.1 | 68.4 |
| II | 16.3 | 16.3 | 16.3 | 16.3 | 16.3 | 16.3 | 16.3 | 16.3 | 16.3 | 16.3 | 19.2 |
| III | 44.6 | 46.6 | 45.3 | 46.6 | 46.6 | 46.6 | 46.6 | 46.6 | 45.3 | 46.6 | 12.4 |

TABLE 5

Composition of the coating compostiions of Examples 11 to 14

| | | Example | | | |
|---|---|---|---|---|---|
| | | 11 | 12 | 13 | 14 |
| I | Binder A1 | 28.0 | 28.2 | 28.0 | 28.2 |
| | Proglyde DMM[1] | 5.4 | 5.4 | 5.9 | 5.9 |
| | Methyl isobutyl ketone | 0.5 | 0.5 | 0.5 | 0.5 |
| | Butyldiglycol acetate | 0.5 | 0.5 | 0.7 | 0.7 |
| | Butyl glycol | 0.5 | 0.5 | — | — |
| | Triton X 100[2] | 0.5 | 0.5 | 0.5 | 0.5 |
| | Byk 331[3] | 0.05 | 0.05 | 0.05 | 0.05 |
| | Tegoflow 425[4] | 0.05 | 0.05 | 0.05 | 0.05 |
| II | Desmodur VPLS 2102[5] | 14.2 | 7.2 | 14.2 | 7.2 |
| | Tolonate HDT LV[6] | — | 6.8 | — | 6.8 |
| | Proglyde DMM[1] | 3.7 | 3.7 | 3.7 | 3.7 |
| III | Water (deion.) | 43.8 | 43.8 | 43.6 | 43.6 |
| | DMEA | 1.2 | 1.2 | 1.2 | 1.2 |
| | Dapral T210[7] (10% strength) | 1.6 | 1.6 | 1.6 | 1.6 |

[1] Commercial dipropylene glycol dimethyl ether from Dow Chemical Company
[2] Aryl-alkyl polyethylene ether alcohol from Rohm and Haas
[3] Commercial leveling additive based on a polyether-modified dimethylpolysiloxane copolymer from Byk
[4] Commercial additive based on a polysiloxane-polyether copolymer from Goldschmidt
[5] Commercial isocyanate based on a hexamethylene diisocyanate allophanate from Bayer AG
[6] Commercial isocyanate based on a hexamethylene diisocyanate trimer from Rhône-Poulenc
[7] Nonionic polyurethane thickener (10% strength in water) from Akzo

TABLE 6

Test results for the coatings of Examples 1 to 10 and of Comparative Example 1

| Example | Blistering | Haze | Swelling | Blistering | Haze | Swelling | Hardness RT | Hardness 30'60° C. |
|---|---|---|---|---|---|---|---|---|
| 1 | m4/g0-1 | 0 | 1 | 0 | 0 | 0-1 | 108 | 131 |
| 2 | m4/g0-1 | 0 | 1 | m3/g0-1 | 0 | 0-1 | 80 | 117 |
| 3 | 0 | 0 | 1 | 0 | 0 | 0-1 | 98 | 132 |
| 4 | m4/g0-1 | 1 | 1 | 0 | 1 | 0-1 | 107 | 141 |
| 5 | 0 | 0 | 1 | 0 | 0 | 0-1 | 116 | 140 |
| 6 | m5/g0-1 | 0 | 1 | 0 | 0-1 | 0-1 | 108 | 131 |
| 7 | m4/g0-1 | 0-1 | 1 | 0 | 0-1 | 0-1 | 107 | 132 |
| 8 | m5/g0-1 | 0-1 | 1 | m3/g0-1 | 0-1 | 0-1 | 81 | 121 |
| 9 | 0 | 0-1 | 1 | 0 | 0-1 | 0-1 | 107 | 129 |
| 10 | 0 | 0-1 | 1 | 0 | 0-1 | 0-1 | 116 | 129 |
| V1 | m5/g1-2 | 1-2 | 2 | m3/g1 | 1-2 | 1-2 | 106 | 124 |

TABLE 7

Test results for the coatings of Examples 11 to 14

| | Example | | | |
|---|---|---|---|---|
| | 11 | 12 | 13 | 14 |
| Constant climate test | | | | |
| Blistering 0 days | 0 | 0 | 0 | 0 |
| Swelling | 2 | 2 | 2 | 2 |

Note - all films show a fine graininess and slight loss of gloss.
- sample 3 is visually the best.

| Blistering 6 days | m2/gl | m2/gl | m2/gl | m2/gl |
|---|---|---|---|---|
| Swelling | 3 | 3 | 3 | 3 |

Note - do not darken so much as the prior art.
- very fine graininess and fine blistering (bitty).

| Blistering 10 days | m5/gl | m5/gl | m3–4/gl | m3–4/gl |
|---|---|---|---|---|
| Swelling | 3 | 3 | 3 | 3 |

Note - all films have undergone a relatively high degree of matting.

| Regeneration Blistering | m1–2/gl | m1–2/gl | m1/gl | m1/gl |
|---|---|---|---|---|

Note - the change in color and the loss in gloss have receded almost to the
initial values.

Water spray test
0 cycles

| Crosshatch | 0 | 0 | 0 | 0 |
|---|---|---|---|---|
| Cross-cut | 1 | 1 | 1 | 1 |

Note - all films exhibit a good gloss and good evenness.

2 cycles

| Crosshatch | 1 | 1 | 1 | 1 |
|---|---|---|---|---|
| Cross-cut | 1 B | 2–3 B | 1 B | 2 B |

Note - all films still show good gloss.

| Blistering | 0 | 0 | 0 | 0 |
|---|---|---|---|---|
| Swelling | 2 | 2 | 2 | 2 |

5 cycles

| Crosshatch | 0–1 | 1 | 0–1 | 0–1 |
|---|---|---|---|---|
| Cross-cut | 5 with Tesa* | 5 with Tesa | 0 with Tesa | 4 with Tesa |

Note - all films still show good gloss.

| Blistering | 0 | 0 | 0 | 0 |
|---|---|---|---|---|
| Swelling | 3 | 3 | 3 | 3 |

TABLE 7-continued

Test results for the coatings of Examples 11 to 14

| | Example | | | |
|---|---|---|---|---|
| | 11 | 12 | 13 | 14 |
| Regeneration 24 h | | | | |
| Crosshatch | 0 | 0 | 0 | 0 |
| Cross-cut | 0 with Tesa | 0 with Tesa | 0 with Tesa | 0 with Tesa |

Note - all films are exactly like the prior art in evenness and gloss.

*Tesa = commercial adhesive tape.

SUMMARY OF THE TEST RESULTS

The test results (Examples 1–10) in Table 6 show clearly that the components (I) and (II) which were premixed as organic formulations produce better technological properties and exposure to a wet climate than the mixing of an aqueous component (I) with organic polyisocyanate (Comparative Example Vi in analogy to EP-B-0358 979).

Fewer instances of blistering, haze and swelling occur than in the case of the systems described in EP-B-0358 979.

In addition, the results in Table 7 show that the use of butyl glycol gives rise to poorer humid and constant climate tests. The two variants without butyl glycol, moreover, give better visual results (evenness, topcoat appearance).

What is claimed is:

1. A coating composition comprising:
   (a) a first component comprising a solution or dispersion of at least one binder in one or more organic, water-dilutable solvents, wherein the binder is selected from the group consisting of:
      (A1) acrylate copolymers having a number-average molecular weight of from 1000 to 30,000, an OH number of from 40 to 200 mg of KOH/g, and an acid number of from 5 to 150 mg of KOH/g;
      (A2) polyester resins having a number-average molecular weight of from 1000 to 30,000, an OH number of from 30 to 250 mg of KOH/g, and an acid number of from 5 to 150 mg of KOH/g;
      (A3) polyurethane resins having a number-average molecular weight of from 1000 to 30,000, an OH number of from 20 to 200 mg of KOH/g, and an acid number of from 5 to 150 mg of KOH/g,
      and mixtures thereof,
      wherein a 50% solution of the binder portion of the first component in ethoxyethyl propionate has a viscosity at 23° C. of ≦2.5 dPa·s;

(b) a second component comprising a crosslinking agent comprising
   (F1) at least 70% by weight of at least one member selected from the group consisting of nonblocked diisocyanates, nonblocked polyisocyanates, and mixtures thereof,
   (F2) from 2 to 20% by weight of at least one epoxide compound having at least 2 epoxide groups per molecule, and
   (F3) from 2 to 20% by weight of at least one amino resin
(c) a third component that is essentially binder-free and contains water.

2. A coating composition according to claim 1, wherein the composition comprises:
a) a first component consisting essentially of:
   (1) from 35 to 80% by weight of the binder,
   (2) from 5 to 50% by weight of a member selected from the group consisting of pigments, fillers, and mixture thereof,
   (3) from 10 to 40% by weight of at least one organic, water-dilutable solvent,
   (4) from 2 to 10% by weight of at least one neutralizing agent, and
   (5) from 2 to 10% by weight of at least one conventional additive;
b) a second component consisting essentially of:
   (1) from 60 to 90% by weight of a crosslinking agent comprising:
      (F1) at least 70% by weight of at least one member selected from the group consisting of nonblocked diisocyanates, nonblocked polyisocyanates, and mixtures thereof,
      (F2) from 2 to 20% by weight of at least one epoxide compound having at least 2 epoxide groups per molecule, and
      (F3) from 2 to 20% by weight of at least one amino resin
   (2) from 10 to 40% by weight of at least one organic, water-miscible solvent, and
   (3) from 0 to 10% by weight of at least one conventional additive;
c) a third component consisting essentially of:
   (1) from 80 to 95% by weight of water,
   (2) from 2 to 10% by weight of at least one neutralizing agent,
   (3) from 2 to 10% by weight of at least one conventional additive, and
   (4) from 0 to 10% by weight of at least one emulsion polymer.

3. A process for the preparation of the coating composition according to claim 1 comprising the steps of:
a) providing a first component comprising a solution of a binder in one or more organic, water-dilutable solvents, wherein the binder is selected from the group consisting of:
   (A1) acrylate copolymers having a number-average molecular weight of from 1000 to 30,000, an OH number of from 40 to 200 mg of KOH/g, and an acid number of from 5 to 150 mg of KOH/g;
   (A2) polyester resins having a number-average molecular weight of from 1000 to 30,000, an OH number of from 30 to 250 mg of KOH/g, and an acid number of from 5 to 150 mg of KOH/g;
   (A3) polyurethane resins having a number-average molecular weight of from 1000 to 30,000, an OH number of from 20 to 200 mg of KOH/g, and an acid number of from 5 to 150 mg of KOH/g, and mixtures thereof,
   wherein a 50% solution of the binder portion of the first component in ethoxyethyl propionate has a viscosity at 23° C. of $\leq$2.5 dPa·s;
b) dispersing in the first component a neutralizing agent,
c) adding together the dispersed first component and a third component that is essentially binder free and contains water, to provide a mixture, and
d) mixing in to the mixture of the first and third components, a second component comprising a crosslinking agent comprising
   (F1) at least 70% by weight of at least one member selected from the group consisting of nonblocked diisocyanates, nonblocked polyisocyanates, and mixtures thereof,
   (F2) from 2 to 20% by weight of at least one epoxide compound having at least 2 epoxide groups per molecule, and
   (F3) from 2 to 20% by weight of at least one amino resin.

4. A process for coating plastics with a coating composition comprising the steps of:
a) providing a three-component coating composition comprising
   (a) a first component comprising a solution or dispersion of at least one binder in one or more organic, water-dilutable solvents, wherein the binder is selected from the group consisting of:
      (A1) acrylate copolymers having a number-average molecular weight of from 1000 to 30,000, an OH number of from 40 to 200 mg of KOH/g, and an acid number of from 5 to 150 mg of KOH/g;
      (A2) polyester resins having a number-average molecular weight of from 1000 to 30,000, an OH number of from 30 to 250 mg of KOH/g, and an acid number of from 5 to 150 mg of KOH/g;
      (A3) polyurethane resins having a number-average molecular weight of from 1000 to 30,000, an OH number of from 20 to 200 mg of KOH/g, and an acid number of from 5 to 150 mg of KOH/g,
      and mixtures thereof, and a neutralizing agent,
      wherein a 50% solution of the binder portion of the first component in ethoxyethyl propionate has a viscosity at 23° C. of $\leq$2.5 dPa·s;
   (b) a second component comprising a crosslinking agent comprising
      (F1) at least 70% by weight of at least one member selected from the group consisting of nonblocked diisocyanates, nonblocked polyisocyanates, and mixtures thereof,
      (F2) from 2 to 20% by weight of at least one epoxide compound having at least 2 epoxide groups per molecule, and
      (F3) from 2 to 20% by weight of at least one amino resin, and
   (c) a third component that is essentially binder-free and contains water,
b) mixing the first and second components of the composition,
c) adding a coating additive to the mixed first and second components to provide a mixture,
d) dispersing the mixture into the third component to provide a coating composition, and
e) coating a plastic substrate with the coating composition by means selected from the group consisting of spraying, knife-coating, brushing, and dipping.

* * * * *